June 11, 1940.  A. F. GAIDOS  2,204,013
SUPPORT
Filed June 24, 1938
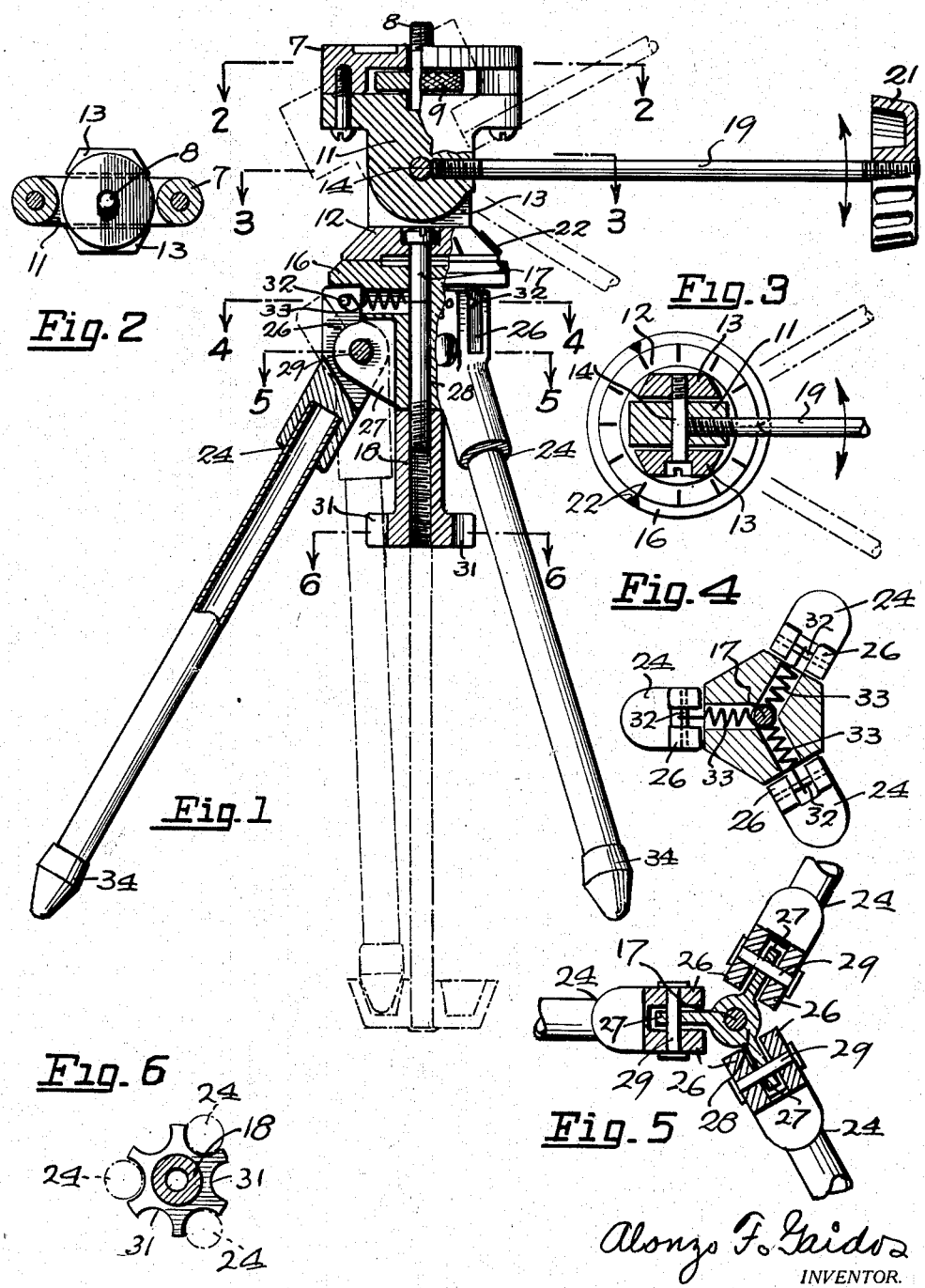
Alonzo F. Gaidos
INVENTOR.
BY George B. White
ATTORNEYS.

Patented June 11, 1940

2,204,013

UNITED STATES PATENT OFFICE 2,204,013

SUPPORT

Alonzo F. Gaidos, Redwood City, Calif.

Application June 24, 1938, Serial No. 215,611

4 Claims. (Cl. 248—168)

My invention pertains to a support for optical or photographic apparatus or the like.

An object of this invention is to provide a device on which cameras or optical apparatus may be supported while in the act of photographing objects with either still or motion picture cameras or viewing terrain or terrestrial subjects and to provide a compact, conveniently arranged device which readily adjusts its supporting feet automatically.

Another object of my invention is to provide a mounting for instruments which may be traversed 360° and elevated or depressed to any convenient angle for the purpose of photographing or viewing objects, and which both the elevating and traversing mechanism may be locked at will to prevent moving the apparatus while in the act of making exposures, if so desired.

Another object of this invention is to provide a support for photographic or optical apparatus which is highly useful and simple in construction. Convenience of arrangement, lightness and comparative inexpense of manufacture are further objects which have been borne in mind in the development of the invention.

I am aware some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawing. With the foregoing and other objects in view, which will be made manifest in the following detailed description and specifically pointed out in the appended claims, reference is had to the accompanying drawing for the illustrative embodiment of the invention, wherein:

Figure 1 is a partial cross sectional view of my tripod showing the elevating and traversing connections as well as the position of the supporting legs when unlocked from their folded position.

Figure 2 is a view of the instrument anchoring screw mechanism taken on line 2—2 of Fig. 1.

Figure 3 is a view of the traversing mechanism taken on line 3—3 of Fig. 1.

Figure 4 is a view of the spring arrangement taken on line 4—4 of Fig. 1, for automatically adjusting the supporting legs of the support.

Figure 5 is a view of the joints of the supporting legs taken on line 5—5 of Fig. 1.

Figure 6 is a view of the traversing lock taken on line 6—6 of Fig. 1, and showing the position of the supporting legs when folded.

In carrying out my invention I make use of a support or platform 7 on which can be rested an instrument or camera, not shown. The usual threaded socket of an instrument or camera is engaged by a screw 8 which extends above the platform 7. The screw 8 is rotatable in the platform 7 and is turned by means of a knurled nut 9 which is fixed on the portion of the screw 8 below the platform 7. The platform 7 is so recessed at its underside that the knurled nut 9 is accessible from the outside for turning the screw 8 into or out of the retaining socket of a camera, without necessitating the turning of the camera.

The supporting platform 7 is mounted for substantially universal adjustment by means of an elevating head 11 and a traversing head 12, which latter has spaced brackets 13. The elevating head 11 is secured at its upper end to the platform 7 and it is rockable on a fulcrum pin 14 fixed through said brackets 13. The traversing head 12 is mounted on a base 16 by means of a pivot 17 which latter extends through the base 16 and is held by a threaded locking knob 18 centrally positioned below the base 16. A handle 19 is threaded into the elevating head 11 so as to bear against the fulcrum pin 14 and to fasten the elevating head 11 in an adjusted position and against rocking relatively to the traversing head 12. The head 19 terminates in a knob 21 whereby it may be grasped.

The instrument can be adjusted by manipulating the handle 19. When the handle 19 is loosened in the elevating head 11 then the elevating head 11 can be rocked upwardly or downwardly around the pin 14 so as to raise or lower the camera. At the same time by pulling the handle 19 around in the direction of the arrows in Fig. 3, the traversing head 12 is rotated so as to turn the camera on the platform 7 if necessary 360°. Therefore the platform 7 is connected substantially with freedom of universal adjustment to the base 16 by means of two connecting elements one of which, the elevating head 11, is rockable with the platform 7 relatively to the traversing head 12, and the whole unit is turnable relatively to the base 16 around the pivot 17 of the other element the traversing head 12. The support can be fastened against rocking in any adjusted position by tightening the handle 19. The support can be fastened against traversing rotation by tightening the locking knob 18 so as to pull the pivot 17 and fix the traversing head 12 onto the base 16. Graduation marks 22 are provided on the traversing head 12 and on the base 11 for facilitating the setting of the instrument at a desired angle.

Legs 24 are pivoted on the base 16 by means of forked mountings 26 which straddle lugs 27 on a hub 28 of the base 16 and are held by the usual pivot pin 29. It is to be noted that the locking knob 18 abuts against the end of the base hub 28 and that knob 18 has recesses 31 around its periphery in which the legs 24 can be located in compact, folded position as indicated in broken lines in Fig. 1 and Fig. 6.

The forks 26 of the legs 24 extend beyond the pivots 29 and have fixed pins 32 therein. A spring 33 is disposed above each leg 24 and has one end anchored to the pivot 17 and its other end to the fixed pin 32 of the respective leg 24 so as to normally pull the pin 32 toward the center thereby urging the leg 24 outwardly. Each leg has a soft shoe or tip 34 on its outer end so as to allow a firm stand without marring the surface on which the device is set. When the legs 24 are folded they can be held in compact position by the handle 19, which latter, when not in use, can be removed from the elevating head 11 and threaded into the locking knob 18 opposite the end of the pivot 17. The knob 21 on the handle 19 is hollow so as to accommodate the tips 34 of the legs 24 therein and to prevent the spreading of the legs 24 when the device is packed in collapsed assembly as indicated by broken lines in Fig. 1.

Having thus described my invention what I now claim and desire to secure by Letters Patent is:

1. In a supporting device of the character described, a base, legs on the base being pivoted to be swingable toward the center line of the device into a collapsed position, a support, a universal mounting for the support on the base, a fastening element extended through the base forming one of the pivots of said universal mounting, means extended from the side of the base opposite to said mounting to tighten said fastening element, means on said tightening means to engage the legs in collapsed position, and means to releasably hold said legs in collapsed position.

2. The combination with a support for a photographic or optical apparatus in which a supporting element is adjustably connected to a base, and legs foldably extended from the base, of a handle member detachably connected to said support for manipulating the supporting element into adjusted positions, means for fastening said handle member to the base in an inoperative position along the folded legs, and means on the handle member for engaging said legs in said inoperative position.

3. The combination with a supporting device for photographing or optical apparatus including a support adapted to engage the apparatus, a base, and adjustable means to connect said support to said base; of legs extended from said base so as to be swingable outwardly, an adjusting handle for the support being detachable from the support, means for attaching the handle in position along the legs when not in use, and means on the handle to engage and hold the legs together in folded position.

4. The combination with a supporting device for photographing or optical apparatus including a support adapted to engage the apparatus, a base, and adjustable means to connect said support to said base; of legs extended from said base so as to be swingable outwardly, an adjusting handle for the support being detachable from the support, means for attaching the handle in position along the legs when not in use, and means on the handle to engage and hold the legs together in folded position, a pivot for said connection means extended through said base, means to fix said pivot against movement, means on said pivot fastening means to locate said legs in folded position, said handle attaching means being located on said pivot fixing means.

ALONZO F. GAIDOS.